Patented Sept. 19, 1922.

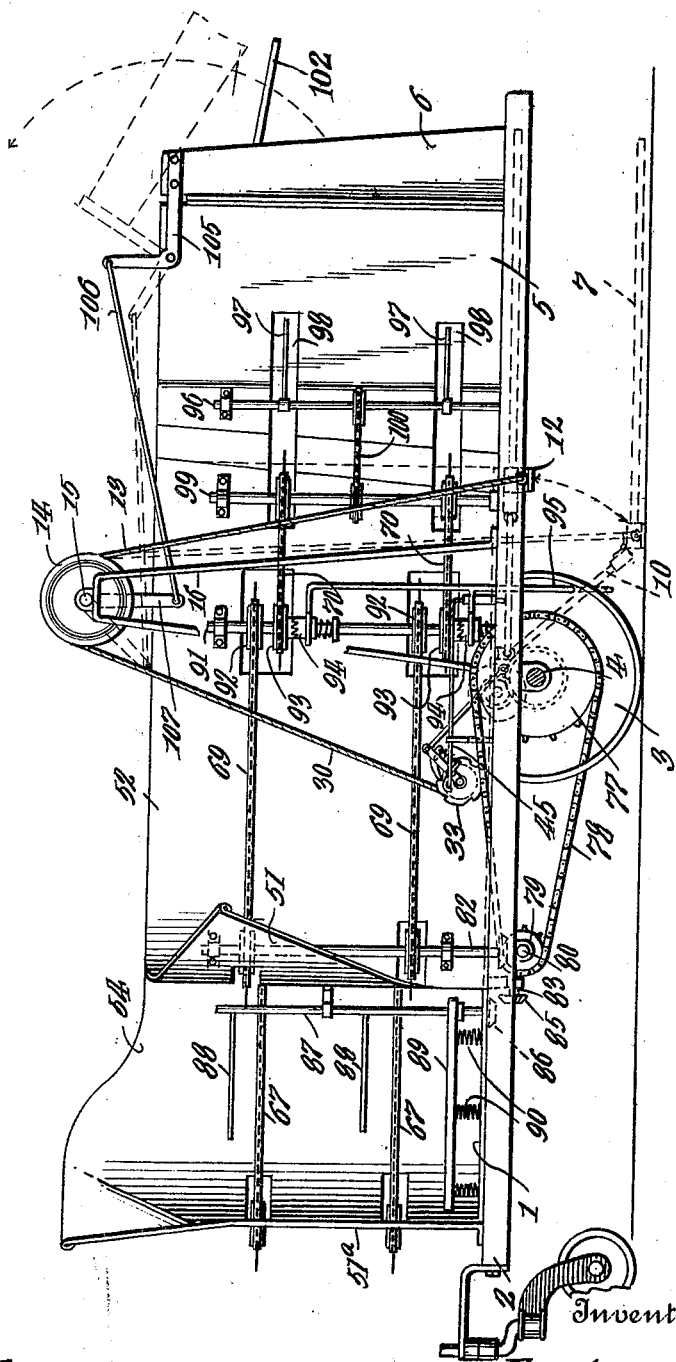

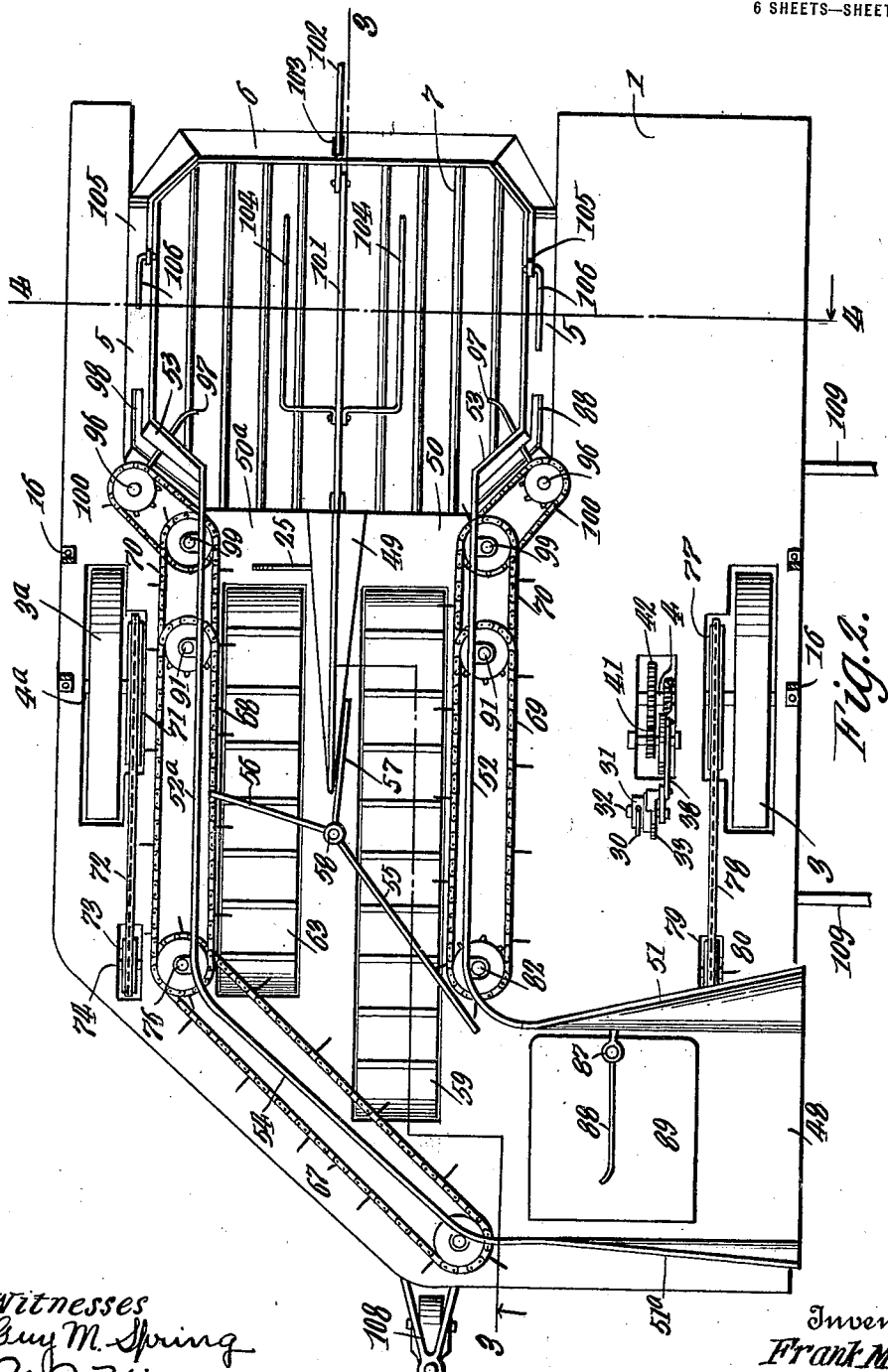
F. McCANN
SHOCK FORMING MACHINE.
APPLICATION FILED DEC. 10, 1918.
1,429,603.
Patented Sept. 19, 1922.
6 SHEETS—SHEET 2.
Witnesses
Guy M. Spring
U. B. Hillyard
Inventor
Frank McCann
By Richard B. Owen, Attorney

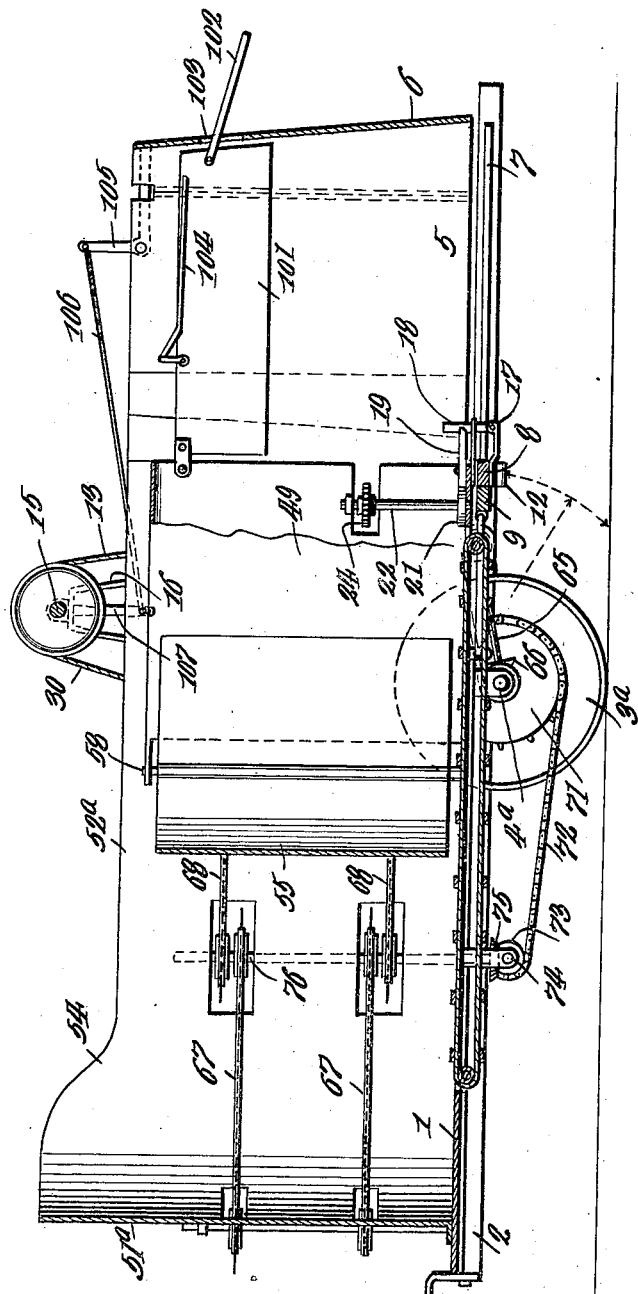

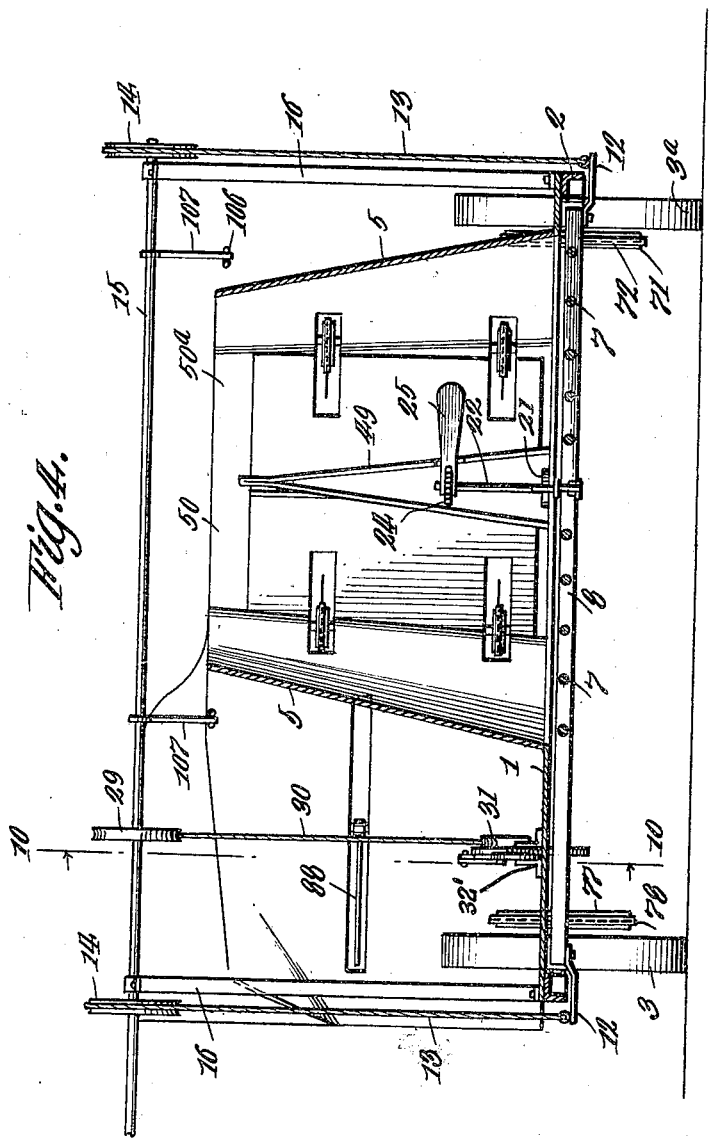

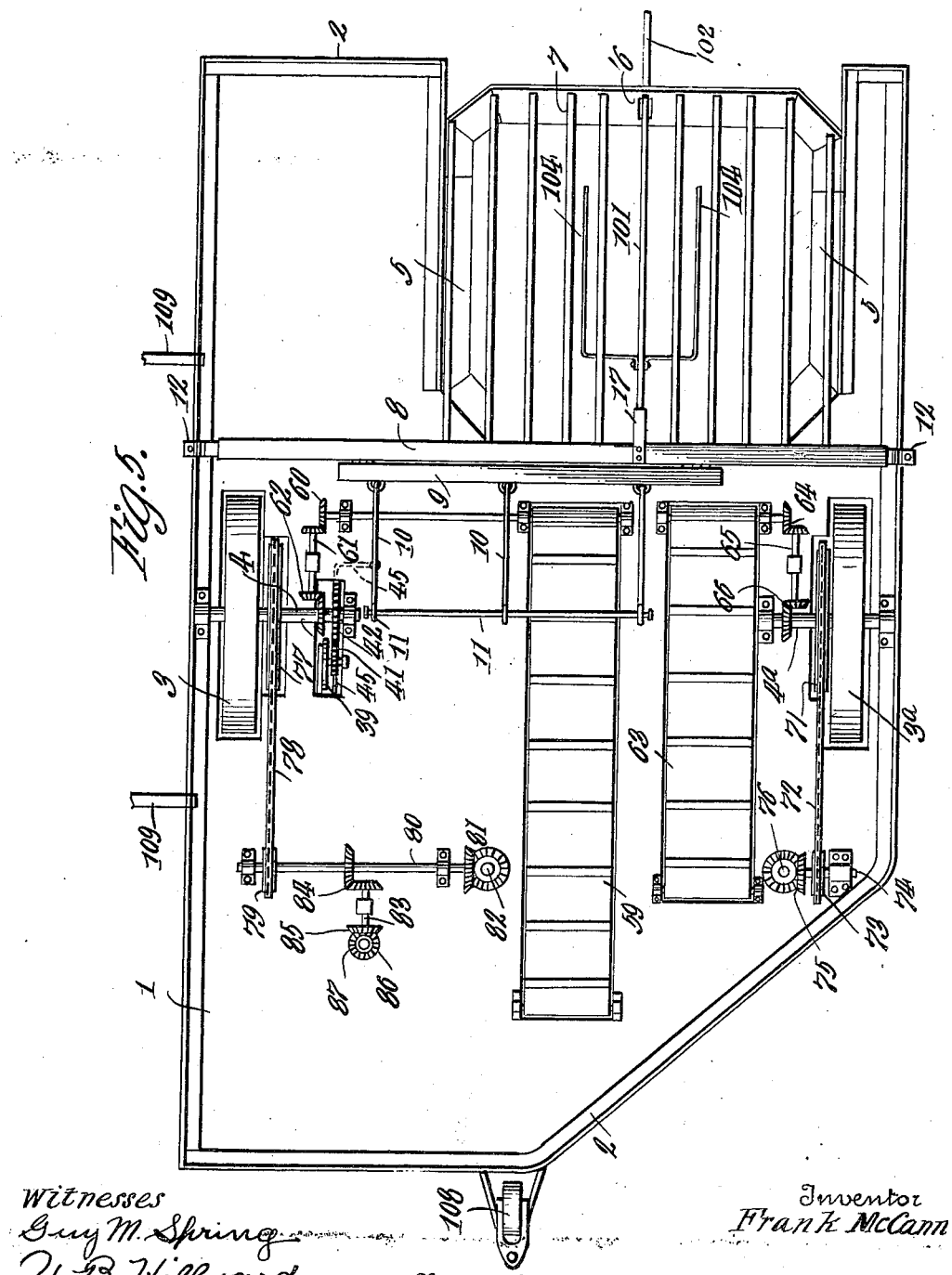

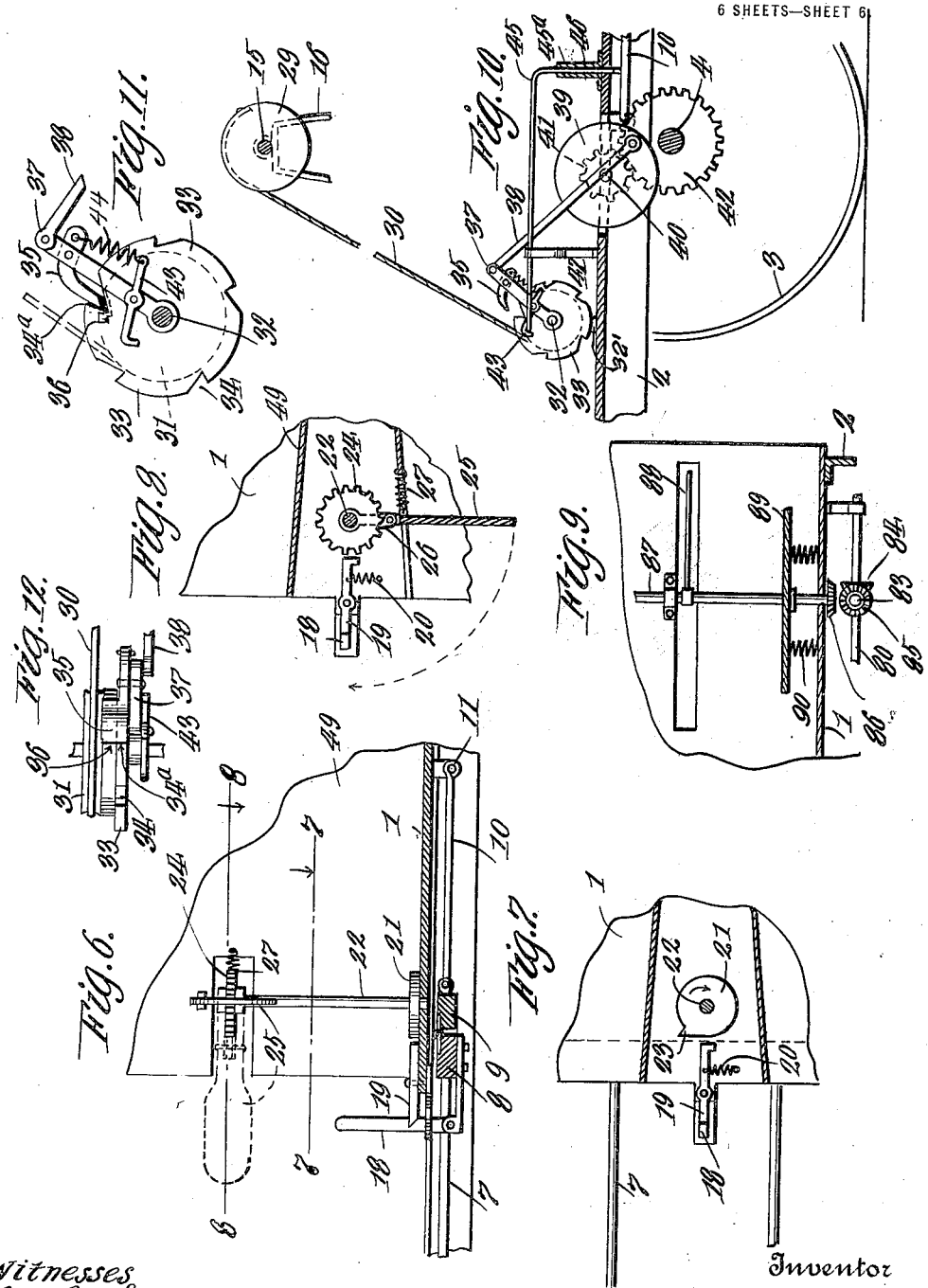

1,429,603

UNITED STATES PATENT OFFICE.

FRANK McCANN, OF NORTH BATTLEFORD, SASKATCHEWAN, CANADA.

SHOCK-FORMING MACHINE.

Application filed December 10, 1918. Serial No. 266,102.

*To all whom it may concern:*

Be it known that I, FRANK McCANN, a subject of Canada, residing at North Battleford, in the Province of Saskatchewan and Dominion of Canada, have invented certain new and useful Improvements in Shock-Forming Machines, of which the following is a specification.

The invention relates to the type of agricultural machinery operable in the field jointly with a harvester binder to receive the sheaves or bundles of grain therefrom and deposit them upon the ground at given intervals in shock formation to admit of the quick gathering when it is required to transport the grain to a point of storage, such as a stack, or to a threshing machine.

The invention has for its object the provision of a shock forming machine in which the weight of a sheaf is utilized to throw the feeding machinism into gear with the driving mechanism to advance the sheaves to the shock forming compartment.

The invention furthermore provides a shock forming machine having two passages intermediate the main receiving passage and the shock forming compartment and a gate to automatically direct the sheaves through said passages in alternation, and an arm or analogous member disposed in the path of the sheaves through one of the passages to be positively actuated by the sheaves and serving as means to release the shock which settles upon the ground and clears the machine as the latter moves forward.

The invention also provides a machine of the character aforesaid in which the forward movement of the sheaves is arrested or retarded during the interval between the discharge of the shock and the restoring of the parts associated with the shock forming compartment and delivery mechanism.

The invention also aims to provide novel means whereby after a predetermined number of sheaves have accumulated to form a shock the supporting means for the latter or shock carrier is automatically tripped to admit of the settling of the shock upon the ground so as to automatically discharge and to provide means which during the interim of the discharge of the shock and the resetting of the shock mechanism are operated to restore the parts to normal position.

The invention also aims furthermore to provide unique feeding mechanism, whereby the sheaves after being delivered to the shocker from the binder are positively advanced to the shock forming compartment and are properly positioned therein to form a compact shock preliminary to the delivery of the latter.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

Referring to the accompanying drawings which are illustrative of the invention,

Fig. 1 is a view in elevation of a shock forming machine embodying the invention, the dotted lines indicating the relative position of the movable parts of the shock forming compartment when moved to permit of the discharge of the shock.

Fig. 2 is a top plan view of the machine.

Fig. 3 is a longitudinal section on the line 3—3 of Fig. 2 looking in the direction of the arrows.

Fig 4 is a transverse section on the line 4—4 of Fig. 2 looking to the front as indicated by the arrows.

Fig. 5 is a view of the machine as seen from the under side.

Fig. 6 is a sectional detail of a portion of the shock carrier and the parts intermittently associated therewith illustrating a portion of the machine to which the parts are attached.

Fig. 7 is a horizontal section on the line 7—7 of Fig. 6.

Fig. 8 is a horizontal section on the line 8—8 of Fig. 6.

Fig. 9 is a detail view of the yieldable platform upon which the sheaves are delivered from the binder and the mechanism thrown into gear when said platform is depressed by the weight of a sheaf.

Fig. 10 is a sectional detail on the line 10—10 of Fig. 4 looking to the right, the intermediate portion being broken away and the parts beyond the plane of the section being omitted.

Fig. 11 is a detail view of the intermittently operated mechanism for returning the movable parts of the shock forming compartment to normal position.

Fig. 12 is a plan view of the parts shown in Fig. 11.

Corresponding and like parts are referred to in the following description and indicated in the several views of the drawing by like reference characters.

The machine is preferably mounted upon supporting wheels to facilitate its travel over the field and said wheels are furthermore utilized as drivers for operating the positively driven parts. The main frame of the machine comprises a bed 1 and a subframe 2 which may be of any construction. There are two supporting wheels 3 and $3^a$ and two axles 4 and $4^a$. The shock forming compartment is located at the rear of the machine and the bed 1 is cut away in line with such compartment to admit of the discharge of the shock after the predetermined number of sheaves have accumulated upon the shock carrier.

The shock forming compartment is comprised between side walls 5, a rear wall 6 and a shock carrier, the latter constituting the bottom of the shock forming compartment and comprising a plurality of rods, bars or tines 7. The side walls 5 are fixed whereas the rear wall 6 and the bottom or shock carrier are movable, the rear wall being adapted to be elevated as indicated by the dotted lines in Fig. 1 so as to clear the shock and the bottom or shock carrier 7 being mounted to drop to deposit the shock upon the ground, the machine in its continued forward movement withdrawing the shock carrier from beneath the shock, whereby the latter is left standing in substantially the same position in which it was deposited upon the ground in the delivery of the shock from its forming compartment. The rods 7 are secured at their inner or front ends to a cross bar 8 which is adapted to have a vertical movement to admit of depositing the shock upon the ground. The cross bar 8 is hinged to a cross bar 9 which is disposed in advance thereof. The cross bar 9 is movable vertically with the cross bar 8 and the hinged connection between the two cross bars admits of the cross bar 8 resting squarely upon the ground when the shock carrier is lowered to discharge the shock. A plurality of links 10 connect the cross bar 9 with a rod 11 which is mounted in bearings secured to the under side of the bed 1. Fig. 6. The cross bar 8 extends approximately the entire width of the machine and is provided at its ends with metal straps 12 which clear the side members of the subframe 2 and project outwardly beyond said side members and receive the lower ends of cords or like flexible connections 13 which are secured at their upper ends to pulleys 14 fastened to a transverse shaft 15 suitably mounted in standards 16 which are secured at their lower ends to side portions of the bed 1. The shock carrier 7 is normally held in elevated position by means presently to be described in detail.

An arm 17 is secured to the cross bar 8 and projects rearwardly therefrom. A bar 18 is pivotally connected at its lower end to the rear end of the arm 17 and projects vertically and is adapted to be engaged by the rear end of a latch 19 which is pivoted intermediate of its ends to the bed 1 at the inner or receiving end of the shock forming compartment. A spring 20 normally exerts a lateral pull on the front end of the latch 19 to hold said latch in engagement with the bar 18. Figs. 6 and 7. A trip 21 is provided for releasing the latch 19 at a predetermined time, whereby the shock carrier may drop by its own weight and the weight of the shocks thereon to deliver the shock upon the ground. The trip 21 consists of a disk secured to a vertical shaft 22 which is disposed centrally of the shock forming compartment and in advance thereof. The vertical shaft 22 is actuated intermittently being moved a given distance each time a sheaf passes into position for delivery to the shock forming compartment, the last sheaf serving to release the latch 19 by means of the trip 21 with the result that the shock carrier drops and deposits the shock upon the ground. The disk comprising the trip 21 is provided with a projection 23 which comes in contact with the latch 19 and moves the same to effect its disengagement from the bar 18. The vertical shaft 22 is provided with a spur wheel 24 which is secured thereto. An arm 25 mounted loosely on the shaft 22 carries a pawl 26 which coacts with the teeth of the spur wheel 24 to move the latter a distance when the arm 25 is operated by a sheaf passing thereby. The arm 25 normally extends transversely of the machine and in the path of certain sheaves to be positively actuated thereby. A spring 27 normally holds the arm 25 across the path of the sheaves.

The shock carrier is returned to normal position by rotation of the shaft 15 which may be effected automatically or by hand. A handle 28 is secured to a projecting end of the shaft 15—Fig. 4—and is adapted to be operated when the parts are required to be returned to normal position by hand. When the shaft 15 is rotated it winds the cord or other flexible connections 13 upon the pulleys 14 thereby elevating the shock carrier 7 which is held in elevated position by means of the latch 19 and bar 18. To rotate the shaft 15 automatically a pulley 29 is secured thereto and a cord of flexible connection 30 is secured at one end to the pulley 29 and at its opposite end to a pulley 31 loosely mounted upon a shaft 32 journaled in brackets 32′ mounted upon the bed 1 of the machine. The pulley 31 when rotated winds the cord 30 thereon and unwinds said cord from the pulley 29, thereby turning the shaft 15 and rotating the pulleys 14 to wind the cord 13 thereon and elevate the shock carrier 7 in the manner stated. A pulley 33 is mounted concentric with the pulley 31 and is provided in its outer edge with a plurality of notches 34, one of the notches as 34$^a$ being deeper than the remaining notches to admit of a pawl 35 entering a notch 36 in the edge of the pulley or disk 31 so as to turn said pulley and wind the cord or flexible connection 30 thereon. The pulleys or disks 31 and 33 are loose on the shaft 32. A lever 37 is mounted loosely on the shaft 32 and carries the pawl 35 which is pivotally mounted thereon. A pitman 38 connects the outer end of the lever 37 with a crank disk 39 secured to a shaft 40 upon which is securely mounted a spur gear 41 which is in meshing engagement with a spur gear 42 secured to the axle 4. In this manner the lever 37 has an oscillatory movement imparted thereto, whereby the pulley 31 and disk 33 is intermittently actuated. A lever 43 is mounted intermediate of its ends on the lever 37 and a spring 44 connects one end of the lever 43 with the pawl 35. During the formation of a shock the pawl 35 is held clear of the notch pulley or disk 33 as indicated most clearly in Fig. 10, thereby preventing operation of the notch pulley 33. It should be remembered that the lever 37 receives an oscillatory movement whenever the machine is in motion. A restraining member 45 is provided and cooperates with the lever 43 and holds the free end of such lever elevated, whereby the spring 44 is tensioned and pulls downward upon one end of the pawl 35, thereby holding the active end of said pawl clear of the notch pulley or disk 33 as shown in Fig. 10. The restraining member 45 consists of a rod or bar having one end bent vertically as indicated at 45$^a$ and passing through a guide 46 and adapted to be engaged at its lower end by one of the links 10 as shown in Fig. 10. The opposite end of the member 45 extends into the path of the free end of the lever 43 so as to elevate the same and hold the pawl 35 clear of the notched pulley or disk 33 as shown in Fig. 10. A guide 47 extending upwardly from the bed 1 engages the member 45 near its free end so as to direct the member in its vertical movements and hold it in given position.

Leading to the shock forming compartment is a passage way, the same comprising a lateral portion 48 and a longitudinal portion divided by means of a partition 49 to form passage ways 50 and 50$^a$ through which the sheaves alternately pass to the shock forming compartment. The inner end of the lateral portion 48 of the passage way is deflected rearwardly as shown most clearly in Fig. 2 so as to facilitate the travel of the sheaves from the lateral portion 48 to the longitudinal portion of the passage way. The passage way is defined by lateral walls 51 and 51$^a$ and longitudinal walls 52 and 52$^a$, the longitudinal walls being connected at their rear ends to the side walls 5 of the shock forming compartment by means of flared walls 53. An inclined wall 54 connects the inner end of the wall 51$^a$ with the forward end of the longitudinal wall 52$^a$. The longitudinal partition 49 is hollow and tapers upwardly and forwardly. A gate is pivoted in line with the partition 49 and forwardly thereof and comprises three wings 55, 56 and 57. The wings 56 and 57 are rearwardly divergent and are adapted to overlap the forward end of the partition 49 in alternation. The wing 55 is adapted to swing from one side of the lateral passage 48 to the other to direct the sheaves through the passage ways 50 and 50$^a$ in alternation. The axis of the gate is indicated at 58 and is in line with the partition 49 and forwardly thereof. When the gate is in the position indicated in Fig. 2 a sheaf entering the lateral passage 48 is directed into the longitudinal passage 50$^a$ by the wing 55. It will be noticed that the wing 56 obstructs entrance to the longitudinal passage 50$^a$, hence the sheaf in passing the wing 56 presses the same against the partition 49, thereby reversely to the position of the wing 55 which will obstruct entrance to the passage 50$^a$ and cause the next sheaf to enter the passage 50. At this time the wing 57 will obstruct entrance to the passage 50 and will be pressed against the passage 49 by the advancing sheaf, thereby causing the gate to again assume the position indicated in Fig. 2. The gate is entirely automatic in its operation and is controlled by the movement of the sheaves, the latter passing alternately through the passages 50 and 50$^a$ to the shock forming compartment.

The sheaves are positively moved through the several passage ways by means of endless conveyors. An endless conveyor 59 is disposed at the bottom of the passage 50 and is suitably supported at its ends on rollers, the rear roller being connected by means of bevel gearing 60 to a longitudinal shaft 61 which in turn is geared to the axle 4, as indicated at 62. An endless conveyor 63 is arranged at the bottom of the passage 50$^a$ and is supported at its ends on rollers, an extension of the rear roller being connected by means of gearing 64 to a shaft 65 which is geared as at 66 to the axle 4$^a$. The passage way 50$^a$ being shorter than the passage way 50 necessarily results in the provision of a shorter conveyor, hence the endless conveyor 63 is of less length than the endless conveyor 59. The upper runs of the endless conveyors 59 and 63 travel rearwardly and each of the endless conveyors consists of a suitable apron at intervals with flags or flights to make positive engagement with the butts of the sheaves and move the latter through the passage ways. An endless conveyor 67 is mounted upon the inclined wall 54 and comprises upper and lower toothed chains which are mounted upon suitable rollers at the ends of the wall 54. An endless conveyor 68 is associated with the longitudinal wall 52ª and likewise comprises upper and lower toothed chains. An endless conveyor 69 is in cooperative relation with the longitudinal wall 52. An endless conveyor 70 is associated with the rear portions of each of the longitudinal walls 52 and 52ª and is adapted to be intermittently operated, said conveyors 70 being thrown out of action during the discharge of the shock and the resetting of the shock forming mechanism. The endless conveyors 59, 63, 67, 68 and 69 are continuously driven when the shocker is in operation, but the endless conveyors 70 are driven at such times only when the sheaves are passing into the shock forming compartment.

A sprocket wheel 71 is secured to the axle 4ª and a sprocket chain 72 connects the sprocket wheel 71 with a sprocket wheel 73 secured to a shaft 74 which is connected by bevel gearing 75 to a vertical shaft 76 which receives the elements supporting the adjacent end of the endless conveyors 67 and 68. A sprocket wheel 77 is secured to the axle 4 and a sprocket chain 78 connects the sprocket wheel 77 to a sprocket wheel 79 secured to a transverse shaft 80 which is connected at its inner end by bevel gearing 81 to the vertical shaft 82 which carries the elements supporting the forward ends of the toothed chains comprising the endless conveyor 69. A short longitudinal shaft 83 is connected by means of bevel gearing 84 with the transverse shaft 80 and is provided at its front end with a bevel gear 85 which is adapted to meshingly engage with a bevel gear 86 at the lower end of a vertical shaft 87 which is mounted to receive a vertical movement. Fingers 88 project laterally from the shaft 87 and are adapted to sweep through the lateral passage 48 and move the sheaves therethrough. As shown most clearly in Figs. 1 and 9 the shaft 87 is elevated and out of gear with the shaft 83 when there is no sheaf in the passage 48. A platform 89 located within the lateral passage 48 is yieldably mounted upon spring supports 90 in such a manner as to be depressed when a sheaf is delivered thereon from the harvester binder, thereby moving the shaft 87 downward and bringing the bevel gear 86 into engagement with the bevel gear 85, whereby the shaft 87 is caused to rotate to bring the fingers 88 into engagement with the sheaf and force the latter from the platform 89 through the passage 49 into position to be engaged by the endless conveyors 59 and 67 or 69 and 59 according to the position of the gate. The instant the platform 89 is relieved of the weight of the sheaf, the said platform moves upwardly and disengages the shaft 87 from the shaft 83. It is to be understood that the shaft 87 is controlled in its vertical movement by means of the platform 89 so as to be lowered when the platform 89 is depressed and to be elevated when the platform is moved upward by the action of its spring supports 90.

It has been stated that the endless conveyors 70 are operated at such times only when the sheaves are passing into the shock forming compartment and are at rest during the discharge of the shock and the return of the shock forming mechanism to normal position. Inasmuch as the mechanism and the parts are duplicated a detail description of one will suffice for a clear understanding of both, like parts being similarly designated, both on the drawings and in the description. A vertical shaft 91 is located near the rear end of each of the side walls 52 and 52ª and is provided with fixed sprocket wheels 92 around which the endless chains comprising the endless conveyors 69 and 68 pass and which transmit motion from the respective shafts 82 and 76 to the shafts 91. It will thus be understood that the shafts 91 are continuously rotated when the shocker is in operation. Other sprocket wheels 93 are loose on the shafts 91 and support the endless chains comprising the endless conveyors 70. Clutch elements 94 mounted on the shafts 91 to rotate therewith and the movement thereon into and out of clutch engagement with clutch segments of the sprocket wheels 93 serve to throw the endless conveyors 70 into and out of operation. A shipper member 95 is in engagement with the clutch elements 94 so as to move both simultaneously. The shipper member 95 projects below the bed of the machine to within a short distance of the ground as indicated most clearly in Fig. 1 to be engaged by the shock carrier when in its lowest position and hold the clutch elements 94 out of engagement with the sprocket wheels 93. As indicated by the dotted lines in Fig. 1 one of the links 10 forming a part of the shock carrier is adapted to engage the lower end of the shipper member 95 and hold the latter depressed. The clutch elements 94 are spring actuated, hence when the shipper member 95 is released from the restraining action of the shock carrier the clutch elements automatically engage the sprocket wheels 93 and cause them to rotate with the shafts 91.

Vertical shafts 96 are located near the juncture of the walls 53 and 5 and are provided with fingers 97 which are adapted to operate through slots 98 formed in the contiguous ends of said walls, the purpose being to positively move the sheaf when entering the shock forming compartment. These shafts 96 are connected to shafts 99 which support the rear ends of the endless conveyors 70. Sprocket chains 100 connect sprocket wheels secured to the respective shafts 96 and 99. It will thus be understood that the shafts 96 and 99 receiving motion from the sprocket wheels 93 are intermittently rotated, being positively driven at such times only when the sheaves are passing into the shock forming compartment.

A longitudinal partition 101 is disposed in the upper portion of the shock forming compartment and is connected to the upper rear portion of the partition 49. The partition 101 acts as a support for the sheaves to prevent lateral displacement thereof during the formation of the shock. A rod 102 projects rearwardly from the partition 101 and provides a support for the rear end of the partition. The rod 102 passes through a slot 103 formed in the rear wall 6 of the shock forming compartment. Spring presser members 104 are attached at their forward ends to the upper portion of the partition 101, and are designed to engage the tops of the sheaves and press the same towards the partition 101. The presser members 104 consist of spring rods or bars having their forward ends bent inwardly and secured to the partition 101, the inner extensions of the members being sufficiently elevated so as not to obstruct the passage of the sheaves.

The rear wall 6 of the shock forming compartment is movable so as to clear the shock and as shown most clearly in Fig. 1, said wall is attached to the rear ends of longitudinal arms of bell cranks 105 which are pivotally connected to the upper rear portions of the side walls 5. The vertical arms of the bell cranks 105 are connected by rods 106 to arms 107 secured to the shaft 15. Obviously when the shaft 15 rotates the bell cranks 105 are operated and move the rear wall 6 from normal position into the dotted line position indicated in Fig. 1, whereby it may clear the shock in the forward movement of the machine. The rear wall 6 drops back into normal position by its own weight when the shaft 15 is rotated in a counter clock-wise direction to return the shock carrier to normal position. The invention is designed for cooperation with a harvester binder and is located at the delivery side thereof so as to receive the sheaves or bundles as they are delivered from the binder, the shocker being so positioned that the sheaves as discharged from the binder will be received upon the platform 89. In addition to the wheels 3 and 3ª it is proposed to provide a caster wheel 108 which is preferably located at the front end of the machine although this is not essential. Lateral coupling members 109 are provided for attaching the shocker in any convenient manner to the harvester binder. Inasmuch as the coupling means 109 will vary depending upon the make of the binder and the structure of the shocker it is not deemed necessary to attempt a detailed description of such parts. The shocker being coupled to the binder advances over the field therewith, and the sheaves discharged from the binder are received upon the platform 89. As a sheaf is received upon the platform 89 the latter is depressed and moves the shaft 87 downward, thereby bringing the bevel gear 86 into meshing engagement with the bevel gear 85 with the result that a rotary movement is imparted to the shaft 87 thereby causing the fingers 88 to sweep across the platform 89 and move the sheaf therefrom into position to be engaged by the endless conveyor 59 and one or the other of the endless conveyors 67 and 69 according to the relative position of the wing 55 of the gate. The instant the platform 89 is relieved of the weight of the sheaf it moves upward and disconnects the shaft 87 from the shaft 83. The sheaf is directed into one or the other of the passages 50 and 50ª by means of the wing 55. If the gate is set as indicated in Fig. 2 the sheaf will be directed into the passage 50ª and coming in contact with the wing 56 will move the gate so that the next sheaf will pass through the passage 50. The sheaf moving through the passage 50ª actuates the arm 25 and passes into the shock forming compartment being moved therein by the fingers 97. Movement of the arm 25 effects a partial rotation of the shaft 22 and when said shaft has completed a revolution the trip 21 operates the latch 19 to release the shock carrier 7 which drops by its own weight and the weight of the shock thereon. As the shock carrier drops it pulls upon the cord or flexible connection 13 and rotates the shaft 15 in a clock-wise direction, thereby elevating the rear wall 6 into the dotted line position indicated in Fig. 1. Inasmuch as the shock carrier 7 comprises a plurality of longitudinally disposed rods or bars, the butts of the sheaves comprising the shock would come in contact with the ground and the continued forward movement of the shocker will withdraw the shock carrier beneath the shock which latter is left standing upon the ground. As the shock carrier descends it operates the shipper member 95, thereby throwing the endless conveyors 70 and the packer or feeder members 97 out of action so that the advance of the sheaves to the shock forming compartment is retarded or arrested during the delivery of the shock and the returning of the shock forming mechanism to normal position. During the discharge of the shock and the resetting of the shock forming mechanism, the member 46 is released from the restraining action of the shock carrier with the result that the pawl 35 is adapted to cooperate with a notched pulley or disk 33 and when the disk 33 has completed a revolution the deepened notch 34ᵃ registers with the notch 36 in the disk or pulley 31, thereby permitting the pawl 35 to enter the notch 36 and in the next movement of the lever 37 both disks 33 and 31 move together and wind the cord or flexible connection 30 on the pulley 31 and unwind it from the pulley 29, whereby the shaft 15 is rotated in a counter clock-wise direction to admit of the rear wall 6 dropping into normal position and the cord 13 to be wound upon the pulleys 14 to elevate and restore the shock carrier and adjunctive parts to normal position. It is to be understood that the mechanism may be constructed so that the shock may comprise a given number of sheaves or bundles this being determined by the number of movements of the arm 25 during each revolution of the shaft 22.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In a shock forming machine, a lateral receiving passage and an intercommunicating longitudinal passage, a longitudinal portion dividing the rear portion of the longitudinal passage into two delivery passages, a gate vertically pivoted in line with and in advance of the said longitudinal portion and comprising a forwardly extending wing and rearwardly extending diverging wings, the forwardly extending wing alternately connecting the lateral receiving passage with one of the delivery passages, a sheaf feeder in the receiving passage adapted to be automatically thrown into action by the weight of the sheaves, and conveyors for positively moving the sheaves through the longitudinal passage.

2. In a shock forming machine, a lateral receiving passage and an intercommunicating longitudinal passage, a longitudinal portion dividing the rear portion of the longitudinal passage into two delivery passages, a gate vertically pivoted in line with and in advance of the said longitudinal portion and comprising a forwardly extending wing and rearwardly extending diverging wings, the forwardly extending wing alternately connecting the lateral receiving passage with one of the delivery passages, an inclined conveyor at the front end of the longitudinal passage, and bottom conveyors in the longitudinal passage, one of the bottom conveyors being relatively short and the other long.

3. In a shock forming machine, a passage way, a shock forming compartment in the rear of the passage way to receive the sheaves therefrom, a continuously driven feeding mechanism for advancing the sheaves through the forward portion of the passage way and intermittently operated feeding mechanism for moving the sheaves through the rear portion of the passage way, gearing connecting the continuously driven feeding mechansim with the intermittently operated feeding mechanism and comprising a clutch and a member movable with the shock when the latter is discharging to actuate the said clutch and throw the intermittently operated feeding mechanism out of action.

4. In a shock forming machine, a passage way, a shock forming compartment in the rear of the passage way to receive the sheaves therefrom, a continuously driven feeding mechanism for advancing sheaves through the forward portion of the passage way and intermittently operated feeding mechanism for moving the sheaves through the rear portion of the passage way, packer mechanism for positively moving the sheaves in the shock forming compartment and geared to the intermittently operated feeding mechanism, gearing connecting the continuously driven feeding mechanism with the intermittently operated feeding mechanism and comprising a clutch and a member movable with the shock when the latter is discharging to actuate the said clutch and throw the intermittently operated feeding mechanism out of action.

5. In a shock forming machine, a shock carrier mounted to move vertically, a latch mechanism for holding the shock carrier in elevated position, a trip for releasing the latch mechanism, a toothed wheel movable with the trip, a pivoted arm actuatable by the sheaves, and a pawl carried by the arm and coacting with the toothed wheel to operate it and the trip to effect a release of the shock carrier when the predetermined number of sheaves to form the shock have accumulated.

6. In a shock forming machine, a shock carrier mounted to move vertically, a latch mechanism for holding the shock carrier in elevated position, a shaft, a trip secured to the shaft and adapted to operate said latch mechanism at each revolution of the shaft, a toothed wheel secured to the shaft to rotate therewith, an arm loose on the shaft and operable by the sheaves, and a pawl carried by the arm and in cooperative engagement with the said toothed wheel.

7. In a shock forming machine, a shock carrier, a latch mechanism for normally holding the shock carrier elevated, a trip mechanism adapted to be operated by the sheaves to release the latch mechanism and means for returning the shock carrier to normal position, the same comprising companion disks concentrically mounted, the one having a plurality of notches and having one of said notches deeper than the remaining notches and the companion disk having a single notch, and a pawl mechanism co-operating with the notched disks.

8. In a shock forming machine, a shock carrier, a latch mechanism for normally holding the shock carrier elevated, a trip mechanism adapted to be operated by the sheaves to release the latch mechanism and means for returning the shock carrier to normal position, the same comprising companion disks concentrically mounted, the one having a plurality of notches and having one of said notches deeper than the remaining notches and the companion disk having a single notch, an oscillatory lever and a pawl carried by said lever and adapted to co-operate with the notched disks.

9. In a shock forming machine, a shock carrier, a latch mechanism for normally holding the shock carrier elevated, a trip mechanism adapted to be operated by the sheaves to release the latch mechanism and means for returning the shock carrier to normal position, the same comprising companion disks concentrically mounted, the one having a plurality of notches and having one of said notches deeper than the remaining notches and the companion disk having a single notch, an oscillatory lever, a pawl mounted thereon and means operable by means of the shock carrier to hold the pawl clear of the disks during the formation of the shock.

In testimony whereof I affix my signature.

FRANK McCANN.